US010641529B2

(12) United States Patent
Opalka et al.

(10) Patent No.: US 10,641,529 B2
(45) Date of Patent: May 5, 2020

(54) HEAT TRANSFER SYSTEM WITH TRIBOFILM ON BEARING SURFACE

(71) Applicant: CARRIER CORPORATION, Jupiter, FL (US)

(72) Inventors: Susanne M. Opalka, Glastonbury, CT (US); Xia Tang, West Hartford, CT (US); Daniel G. Goberman, East Granby, CT (US); Ulf J. Jonsson, South Windsor, CT (US); Zaffir A. Chaudhry, S. Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 141 days.

(21) Appl. No.: 15/737,644

(22) PCT Filed: Jun. 16, 2016

(86) PCT No.: PCT/US2016/037888
§ 371 (c)(1),
(2) Date: Dec. 18, 2017

(87) PCT Pub. No.: WO2016/205528
PCT Pub. Date: Dec. 22, 2016

(65) Prior Publication Data
US 2018/0180332 A1    Jun. 28, 2018

Related U.S. Application Data

(60) Provisional application No. 62/180,472, filed on Jun. 16, 2015.

(51) Int. Cl.
*C09K 5/04* (2006.01)
*F25B 31/00* (2006.01)
(Continued)

(52) U.S. Cl.
CPC .......... *F25B 31/002* (2013.01); *C09K 5/044* (2013.01); *C09K 5/045* (2013.01); *C10M 101/00* (2013.01);
(Continued)

(58) Field of Classification Search
CPC ............... F16C 33/201; F16C 2208/20; F16C 2208/58; F16C 2360/42; F25B 31/002
See application file for complete search history.

(56) References Cited

U.S. PATENT DOCUMENTS 5,017,300 A   5/1991   Raynolds
5,407,601 A   4/1995   Furey et al.
(Continued)

FOREIGN PATENT DOCUMENTS

JP    2010197012 A    9/2010
JP    2013129732 A    7/2013

OTHER PUBLICATIONS

Emerson Escobar Nunez et al., Tribological study of high bearing blended polymer-based coatings for air conditioning and refrigeration compressors, Surface and Coatings Technology, 2010, pp. 2994-3005, vol. 205, No. 8-9, Elsevier BV, Amsterdam, NL.
(Continued)

*Primary Examiner* — John R Hardee
(74) *Attorney, Agent, or Firm* — Cantor Colburn LLP (57) ABSTRACT

A heat transfer system is disclosed that includes a circulation loop of a heat transfer fluid that comprises a halocarbon. The circulation loop includes a compressor or pump that includes bearing rolling surfaces in contact with the heat transfer fluid. The bearing contact surface has a substrate a layer thereon that includes a polymer or oligomer having polar side groups and a tribofilm.

20 Claims, 3 Drawing Sheets

(51) Int. Cl.
   *F04D 29/02*     (2006.01)
   *F04D 29/063*    (2006.01)
   *F04D 29/059*    (2006.01)
   *C10M 101/00*    (2006.01)
   *C10M 105/06*    (2006.01)
   *C10M 105/38*    (2006.01)
   *C10M 107/02*    (2006.01)
   *C10M 107/24*    (2006.01)
   *F16C 33/66*     (2006.01)
   *F25B 13/00*     (2006.01)

(52) U.S. Cl.
   CPC ........ *C10M 105/06* (2013.01); *C10M 105/38* (2013.01); *C10M 107/02* (2013.01); *C10M 107/24* (2013.01); *F04D 29/023* (2013.01); *F04D 29/059* (2013.01); *F04D 29/063* (2013.01); *F16C 33/6688* (2013.01); *F25B 13/00* (2013.01); *C09K 2205/126* (2013.01); *C09K 2205/22* (2013.01); *C10M 2203/065* (2013.01); *C10M 2203/1006* (2013.01); *C10M 2205/0206* (2013.01); *C10M 2207/2835* (2013.01); *C10M 2209/043* (2013.01); *C10N 2240/30* (2013.01); *F05D 2300/43* (2013.01); *F05D 2300/51* (2013.01); *F05D 2300/611* (2013.01); *F16C 2362/52* (2013.01); *F25B 2400/07* (2013.01); *F25B 2500/06* (2013.01); *F25B 2500/16* (2013.01)

(56) References Cited

U.S. PATENT DOCUMENTS

| | | | |
|---|---|---|---|
| 6,286,323 | B1 | 9/2001 | Sgarbi et al. |
| 6,362,139 | B1 | 3/2002 | Sgarbi et al. |
| 7,157,020 | B2 | 1/2007 | Leck et al. |
| 7,560,045 | B2 | 7/2009 | Brown et al. |
| 8,246,852 | B2 | 8/2012 | Serrano et al. |
| 8,703,662 | B2 | 4/2014 | Kaneko et al. |
| 8,980,119 | B2 | 3/2015 | Tsuchiya et al. |
| 2005/0003971 | A1 | 1/2005 | Torchia |
| 2005/0096234 | A1* | 5/2005 | Mack, Sr. ............... C08K 3/38 508/100 |
| 2009/0072187 | A1* | 3/2009 | Kaneko ............... C09K 5/041 252/68 |
| 2010/0012882 | A1 | 1/2010 | Sherman et al. |
| 2012/0021247 | A1 | 1/2012 | Komatsu et al. |
| 2012/0272668 | A1 | 11/2012 | Van Horn et al. |
| 2014/0023540 | A1* | 1/2014 | Heidecker ........... F04C 15/0003 418/55.2 |
| 2014/0087982 | A1 | 3/2014 | Calcavecchio et al. |
| 2014/0179574 | A1 | 6/2014 | Seddon et al. |
| 2014/0314606 | A1 | 10/2014 | Maeyama et al. |
| 2015/0147012 | A1* | 5/2015 | Scancarello ........... F25B 31/00 384/322 |
| 2015/0377389 | A1* | 12/2015 | Blondel ............... B29C 48/022 62/324.6 |

OTHER PUBLICATIONS

International Search Report; International Searching Authority; International Application No. PCT/US2016/037888; dated Aug. 25, 2016; 6 pages.

Seung Min Yeo, Tribology of Ploymeric Coatings for Aggressive Bearing Applications, Doctoral Dissertation, 2013, University of Illinois at Urbana-Champaign, Urbana, Illinois, US, 159 pages.

Written Opinion of International Searching Authority; International Application No. PCT/US2016/037888; dated Aug. 25, 2016; 8 pages.

* cited by examiner

HEAT TRANSFER SYSTEM WITH TRIBOFILM ON BEARING SURFACE

CROSS-REFERENCE TO RELATED APPLICATIONS

This patent application is a National Stage application of International Patent Application Serial No. PCT/US2016/037888, filed Jun. 16, 2016, which claims the benefit of priority to U.S. Provisional Patent Application Ser. No. 62/180,472, filed Jun. 16, 2015, both of which are incorporated herein by reference in their entirety.

BACKGROUND

This disclosure relates to protection of bearing contact surfaces in heat transfer systems such as compressors and pumps.

Heat transfer systems such as refrigeration systems typically include one or more lubricants mixed in a halocarbon heat transfer fluid or refrigerant. The lubricant can help protect bearing contact surfaces such as in compressor rotor bearings from wear. Various oils have been used as refrigerant lubricants, including mineral oils, polyol esters, polyalkylene glycols, alkylbenzenes, polyalpha olefins, or polyvinyl ethers. A typical refrigeration system can operate with levels of lubricant at key locations in flowing refrigerant. The presence of an oil reservoir, typically with more than a kilogram of oil will cause overall content of the heat transfer fluid to exceed 1 percent by weight, based on the total weight of the heat transfer fluid. The concentration will be relatively low in the condenser (e.g., 50 ppm to 500 ppm). At other locations, the concentrations will be higher. For example the oil sump may contain 60 percent oil or more. This oil-rich portion is used to lubricate bearings. Thus, flow to the bearings will typically be well over 50 percent oil. At one or more locations in the system, strainers, stills, or other means may be used to withdraw oil and return it to a reservoir.

However, the use of lubricants in heat transfer fluids can present a number of challenges. For example, the thermodynamic properties of the lubricant will typically be different than those of the refrigerant, which leads to unwanted accumulation of the lubricant in portions of the system where it is not needed for lubrication, such as in the evaporator, instead of at the compressor where it is needed. This can necessitate maintaining higher overall levels of lubricant in order to maintain the desired lubricant content in the oil sump, which tends to adversely affect heat transfer efficiency for the system. Oil separators and oil transfer sumps conduits are often used to remove lubricant from unwanted locations and direct it to compressor. However, such measures can add to system cost, complexity, and maintenance and repair requirements.

The challenges presented by the lubricants used in refrigeration systems have led to interest in oil-free refrigerant systems. Such systems have tended to focus on bearing design and material selection to try and reduce or eliminate the need for lubricants to be added to refrigerant. For example, Lapp et al., WO2013085969 discloses silicon nitride ceramic balls rolling on nitrogen alloy steel races. Although such approaches can improve bearing surface durability, there are still concerns about long term reliability due to wear of the bearing surfaces due to friction. In addition, there has been concern about the breakdown of refrigerants in oil-free systems and the formation of refrigerant breakdown products, including acids leading to corrosion and polymeric deposits that block refrigerant flow through system components. Kujak et al., WO 2014/117014 A2 discloses the use of corrosion inhibitor or stabilizer additives to address the impact of these refrigerant breakdown products, but still requires the presence of a lubricant.

BRIEF DESCRIPTION

In some aspects of this disclosure, a heat transfer system comprises a circulation loop of a heat transfer fluid that comprises a halocarbon. The circulation loop includes a compressor or pump that includes a bearing rolling surfaces in contact with the heat transfer fluid. The bearing rolling surfaces comprise a substrate having thereon a layer comprising an oligomer comprising polar side groups or a polymer comprising polar side groups, and a tribofilm layer.

In some aspects, the heat transfer fluid comprises from 0.008 wt. % to 0.5 wt. % of lubricant oils selected from polyol esters, polyalkylene glycols, polyvinyl ethers, polyalpha olefins, alkylbenzenes, or mineral oils, based on the total weight of the heat transfer fluid.

In some aspects, the heat transfer fluid comprises less than or equal to 0.008 wt. % of lubricant oils selected from polyol esters, polyalkylene glycols, polyvinyl ethers, polyalpha olefins, alkylbenzenes, or mineral oils, based on the total weight of the heat transfer fluid.

In some aspects, the polymer or oligomer has side groups selected from carboxylate, ester, aldehyde or ketone carbonyl, alcohol, nitrile, amine, amide, imide, or imidazole groups.

In some aspects, the oligomer or polymer is selected from polyaryl ether ketones including polyether ether ketones, branched polyethylenimines, polyvinyl pyridines, polyvinyl pyrrolidones, polycarbonates, polyacrylates including polyalkyl acrylates, polyalkyl alkylacrylates, and polyacrylamides, polyacrylic acids, polyacrylonitriles, or polyvinyl imidazoles.

In some aspects, the oligomer contains from 2 to 100 repeat units and the polymer contains from 101 to 1000 repeat units.

In some aspects, layer on the substrate comprises the polymer comprising polar side groups.

In some aspects, layer on the substrate comprises the oligomer comprising polar side groups.

In some aspects, the halocarbon comprises fluoro substituents.

In some aspects, the halocarbon comprises fluoro and chloro substituents.

In some aspects, the halocarbon is a halogenated olefin.

In some aspects, the halogenated olefin is halogenated propene.

In some aspects, the halocarbon is selected from: 1-chloro-3,3,3-trifluoropropene (E-HFO-1233zd or R1233zd(E)), 2-chloro-3,3,3-trifluoropropene, 3,3,3-trifluoropropene (HFO-1234zf), Z-1,3,3,3-tetrafluoropropene (Z—HFO-1234ze), 2,3,3,3-tetrafluoropropene (HFO-1234yf), E-1,2,3,3,3-pentafluoropropene (E-HFO-1255ye), or Z-1,2,3,3,3-pentafluoropropene (Z—HFO-125ye).

In some aspects, the heat transfer fluid further comprises the oligomer or polymer comprising polar side groups dispersed therein.

In some aspects, the heat transfer fluid further comprises one or more additives selected from antioxidants, metal deactivators, corrosion and oxidation inhibitors, acid scavengers, dispersants/detergents, and boundary additives.

In some aspects, the corrosion inhibitor is a vapor phase corrosion inhibitor comprising a carbonate, carboxylate including acetate, benzoate, caprylate, laurate, oleate, salicylate, and sebacate, ester, nitrate, nitrite, chromic, or molybdate salt with a primary, secondary, or tertiary amine; a primary, secondary, or tertiary alkanolamine, ammonia, or quaternary ammonium compound.

In some aspects, the heat transfer system is a vapor compression heat transfer system comprising a compressor that includes said bearing contact surface, a heat rejection heat exchanger, an expansion device, and a heat absorption heat exchanger, connected together by conduits to form the circulation loop.

In some aspects, the bearing contact surface comprises rolling element bearings supporting a rotor of the compressor.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
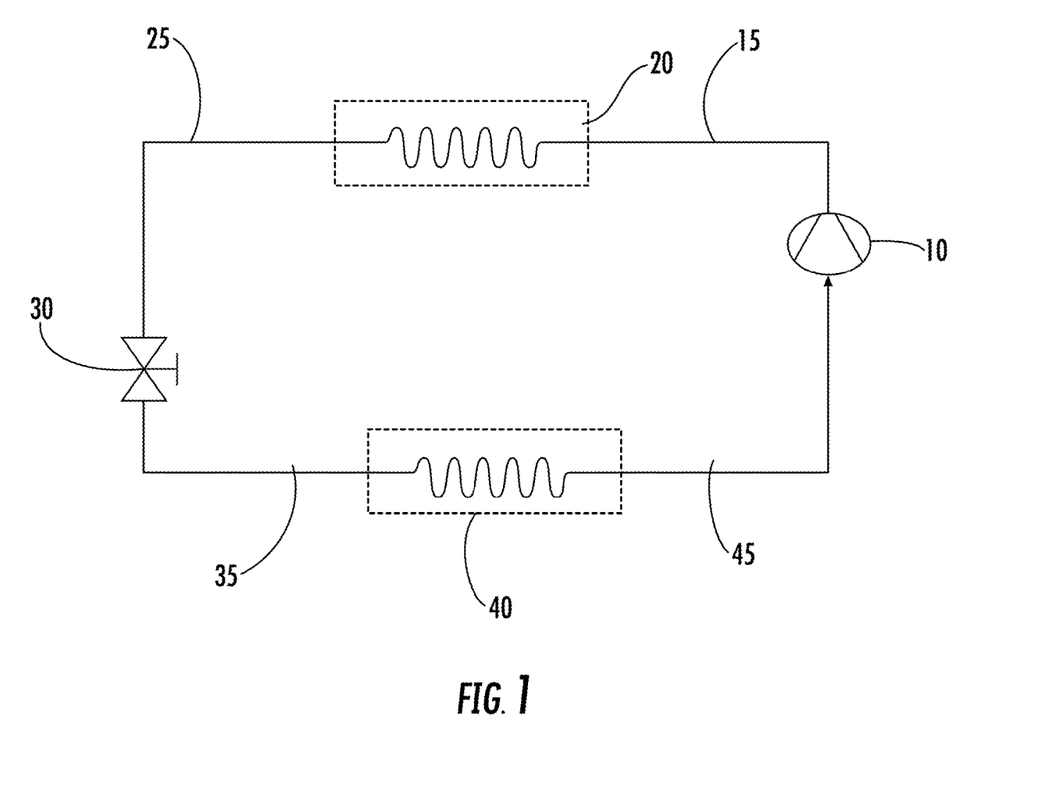
FIG. 1 is a schematic depiction of an exemplary heat transfer system.

Referring now to the Figures, an exemplary heat transfer system with a heat transfer fluid circulation loop is shown in block diagram form in FIG. 1. As shown in FIG. 1, a compressor 10 pressurizes a halocarbon refrigerant or heat transfer fluid in its gaseous state, which both heats the fluid and provides pressure to circulate it throughout the system. As used herein, the term "halocarbon" means a hydrocarbon substituted with one or more halogen atoms in place of hydrogen atoms on the molecule The hot pressurized gaseous heat transfer fluid exiting from the compressor 10 flows through conduit 15 to heat rejection heat exchanger 20, which functions as a heat exchanger to transfer heat from the heat transfer fluid to the surrounding environment, resulting in condensation of the hot gaseous heat transfer fluid to a pressurized moderate temperature liquid. The liquid heat transfer fluid exiting from the heat rejection heat exchanger 20 (e.g., a condenser) flows through conduit 25 to expansion valve 30, where the pressure is reduced. The reduced pressure liquid heat transfer fluid exiting the expansion valve 30 flows through conduit 35 to heat absorption heat exchanger 40 (e.g., an evaporator), which functions as a heat exchanger to absorb heat from the surrounding environment and boil the heat transfer fluid. Gaseous heat transfer fluid exiting the heat rejection heat exchanger 40 flows through conduit 45 to the compressor 10, thus completing the heat transfer fluid loop. The heat transfer system has the effect of transferring heat from the environment surrounding the evaporator 40 to the environment surrounding the heat rejection heat exchanger 20. The thermodynamic properties of the heat transfer fluid allow it to reach a high enough temperature when compressed so that it is greater than the environment surrounding the condenser 20, allowing heat to be transferred to the surrounding environment. The thermodynamic properties of the heat transfer fluid must also have a boiling point at its post-expansion pressure that allows the environment surrounding the heat rejection heat exchanger 40 to provide heat at a temperature to vaporize the liquid heat transfer fluid.

The heat transfer system shown in FIG. 1 can be used as an air conditioning system, in which the exterior of heat rejection heat exchanger 20 is contacted with air in the surrounding outside environment and the heat absorption heat exchanger 40 is contacted with air in an interior environment to be conditioned. Additionally, as is known in the art, the system can also be operated in heat pump mode using a standard multiport switching valve to reverse heat transfer fluid flow direction and the function of the condensers and evaporators, i.e. the condenser in a cooling mode being evaporator in a heat pump mode and the evaporator in a cooling mode being the condenser in a heat pump mode. Additionally, while the heat transfer system shown in FIG. 1 has evaporation and condensation stages for highly efficient heat transfer, other types of heat transfer fluid loops are contemplated as well, such as fluid loops that do not involve a phase change, for example, multi-loop systems such as commercial refrigeration or air conditioning systems where a non-phase change loop thermally connects one of the heat exchangers in an evaporation/condensation loop like FIG. 1 to a surrounding outside environment or to an interior environment to be conditioned.

Figure 2:
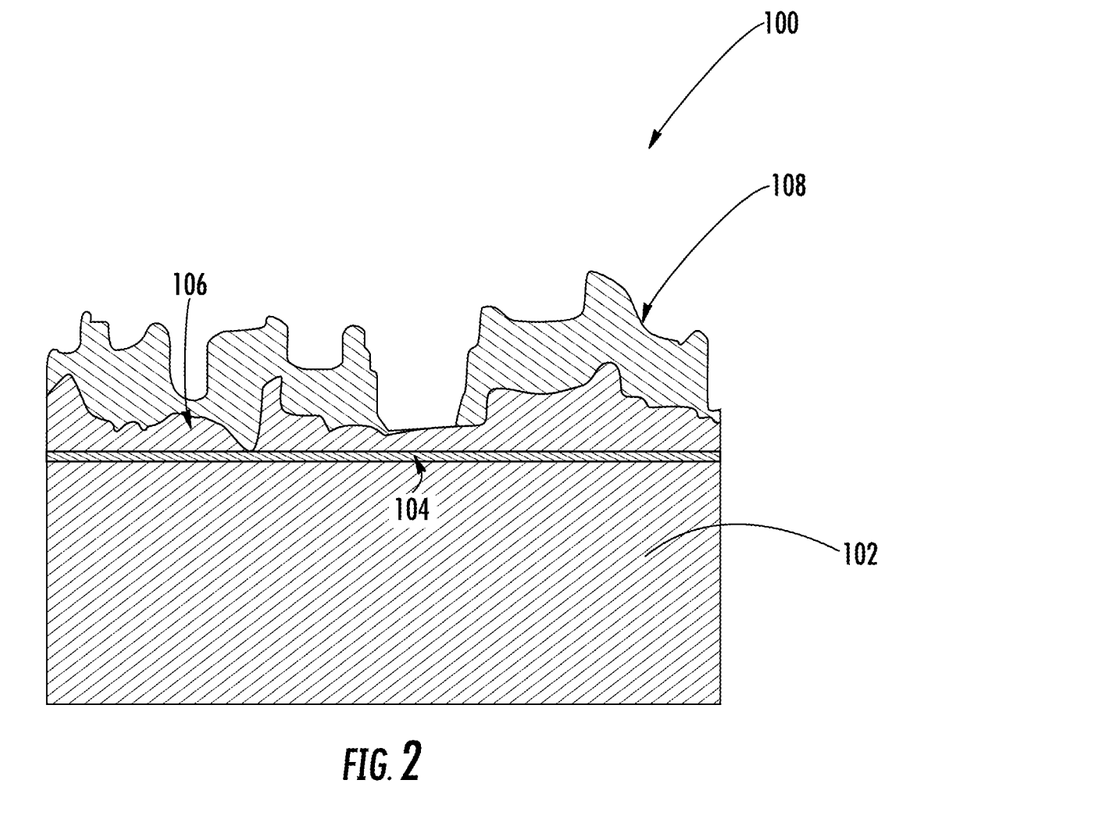
FIG. 2 is a schematic depiction of a cross-sectional view of a bearing contact surface.
Figure 3:
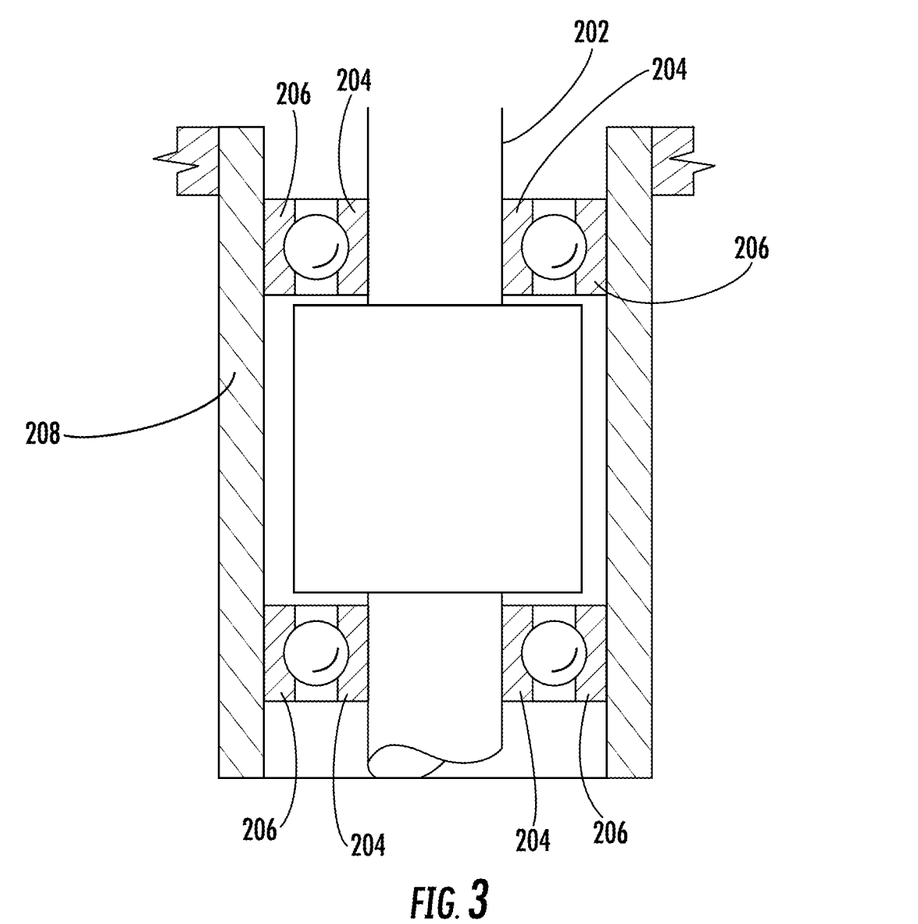
FIG. 3 is a schematic depiction of a bearing assembly.

Turning now to FIG. 2, a cross-section view of an exemplary bearing contact surface 100 is depicted. As shown in FIG. 2, a bearing has a substrate 102. The bearing substrate can be made of any material known for bearing applications, including but not limited to metals (e.g., 52100 bearing steel rings, M50 and high nitrogen CrMo martensitic steels, including BÖHLER N360 (BÖHLER Edelstahl GmbH & Co KG, Kapfenberg, Austria) and CRONIDUR 30 (Energietechnik Essen GmbH, Essen, Germany), and XD15NW (Aubert&Duval, Paris, France), or ceramics (e.g., silicon nitride, aluminum nitride, boron nitride, silicon carbide, cubic or tetragonally stabilized zirconia, alumina). In the case of a metal bearing substrate, there is typically a thin oxide film 104 at the outer edge of the substrate. A first or primer layer 106 is disposed over the bearing substrate 102, and comprises a polymer or oligomer with polar side groups. A second or tribofilm layer 108 is also disposed over the bearing substrate 102. As used herein the term "bearing contact surface" includes rolling elements and also races or rings on which the rolling elements roll. In some embodiments, the rolling element as a ceramic surface as described above. The race or ring surface can be steel, and in some embodiments is a high nitrogen steel, defined as steel having a nitrogen content of at least 0.3 wt. % based on the total weight of the steel. An example of a bearing assembly with rolling elements and rings is schematically depicted in FIG. 3, where rotor 202 is supported by a bearing assembly with inner rings 204 attached to the rotor 202, and outer rings 206 attached to a support structure 208 such as a housing or other support structure maintained in a fixed position. Contact rolling elements 210 are positioned between the inner rings 204 and the outer rings 206.

Polymers and oligomers with polar side groups are known in the art, and are understood to have a molecular structure where electronegativity and charge differences between different atoms or groups of atoms in the molecule or macromolecule provide polarity to the molecular structure. For example, carbon and hydrogen have similar electronegativity values, so straight-chain hydrocarbon polymers like polyethylene are generally considered as non-polar, although polarity can be observed due to the formation of carbonyl groups from polymer oxidative degradation. Generally, however, polymer and oligomer polarity is provided by electronegativity differences in the neat chemical structure of the polymer or oligomer. Polarity-imparting atoms or groups of atoms can be located in the main polymer chain of a polymer or oligomer, or on side groups. The polar polymers and oligomers used in the present disclosure comprise polar side groups, but may also contain polar groups in their backbone.

Various polar side groups can be appended to the polymer or oligomer structure to provide polarity. Organic polar groups containing oxygen or nitrogen are known in the art, and include in general order of decreasing polarity: amides, acids, alcohols, ketones, aldehydes, amines, esters, and ethers. As used herein, the term "side group" means a group of two or more atoms having an electronegativity difference that causes an atom appended to the polymer chain to assume a different electrical charge compared to another atom in the polymer or oligomer molecular structure. The other atom can itself be in the group appended to the polymer backbone (e.g., the carboxylate appended to an acrylic polymer or oligomer) or can be a part of the polymer backbone (e.g., a ketone group in a polyaryl ether ketone polymer or oligomer). Examples of polar side groups include carboxylate, ester, aldehyde or ketone carbonyl, alcohol, nitrile, amine, amide, imide, or imidazole groups. The polymer or oligomer with polar side groups can be a thermoset polymer such as a polyepoxide (like alcohol side groups in an epoxy resin such as a bisphenol epoxy resin, e.g., from the combination of bisphenol A and epiclorohydrin, plus a hardener such as a polyamine or polyanhydride), or it can be a thermoplastic polymer. Examples of polymers and oligomers with polar side groups include polyaryl ether ketones including polyether ether ketones, branched polyethylenimines, polyvinyl pyridines, polyvinyl pyrrolidones, polycarbonates, polyacrylates including polyalkyl acrylates, polyalkyl alkylacrylates, and polyacrylamides, polyacrylic acids, polyacrylonitriles, and polyvinyl imidazoles. In some embodiments, the polar side group contains oxygen atoms (e.g., carbonyl groups or carboxylic acid or ester groups), and/or nitrogen atoms (e.g., amine groups), which have different electronegativity than carbon and hydrogen, to impart polarity to the molecular structure.

The polymer or oligomer chemistry is selected to balance their solubility in the refrigerant media and surface interactions. The polar side groups with oxygen and/or nitrogen strongly adsorb on bearing metal 102 or oxide film 104 surfaces. The polymers can have a wide variety of molecular weights, with the number of repeating units typically ranging from 100 to 1,000. The oligomers have similar repeating monomer molecular structure to the polymers, but with a shorter chain length comprising at least 2 units, often ranging from 10 to 100 repeating units. The molecular weight of the polymer or oligomer is selected to balance solubility in the refrigerant and the mechanical properties of the primer film. In general, the solubility will decrease and the mechanical properties (e.g., stiffness and viscosity) will increase as the molecular weight oligomer or polymer increases.

The polymer or oligomer layer 106 can be prepared in different ways. In some exemplary embodiments, the layer 106 can be applied to the bearing race, ball, or cage substrate surfaces 102 or 104 using known coating techniques such as spray coating, powder coating, dip coating, etc. In some exemplary embodiments, the polar polymer or oligomer is only partially soluble in the heat transfer fluid and the system contains undissolved polymer or oligomer where it was originally applied, in addition to some polymer or oligomer dissolved in the heat transfer fluid, in order to provide self-healing characteristics to the layer 106. Exemplary solubility levels for the polymer or oligomer in the refrigerant can range from 0.01 wt. % to 1 wt. %, more specifically 0.01 wt. % to 0.1 wt. %, based on the total weight of heat transfer fluid and additives. In still other exemplary embodiments, the polar polymer or oligomer can be applied to non-contact bearing rolling surfaces immediately upstream from the bearings, e.g., bearing housing, bearing cage, or filter media, so that a very small amount of the polymer or oligomer dissolves during operation and is carried by the heat transfer fluid to the bearing surface. Alternatively, it can be incorporated as a bearing cage insert such as described in U.S. Pat. No. 5,230,570.

The bonding of the polar primer or oligomer is to the bearing metal/oxide surface is strengthened by reactions that occur under the high pressure (often greater than 1 GPa) and temperature (locally rising to 350° F. (177° C.) or higher) tribological conditions in the bearing contact. These reactions are initiated by mechanical shear of the polar primer side groups interacting with the surfaces, the deformation of asperities, and the exposure of reactive, native metal surfaces in locally occurring boundary or mixed-lubrication regimes. These tribological processes lead to the ejection of low-energy exo-electrons from the contact surfaces. The result is the formation of reactive polar fragments that chemisorb directly on the surface, as well as initiate reactions with the refrigerant fluid. It may be practical to build this primer layer 106 by "running in" or pre-conditioning the bearing in the presence of the oligomer or polymer alone, before charging the system with refrigerant.

As used herein, the term "tribofilm" means a film formed as a result of tribochemical reactions between the surface and the components in the heat transfer or refrigerant fluid, including but not limited to the halocarbon refrigerant itself, lubricating oils, or additives in the fluid. Refrigerant-derived tribofilms are typically formed during operation of the heat transfer system when components in the heat transfer fluid decompose and react under the tribological conditions in the bearing contact. In the absence of the polar polymer or oligomer, the refrigerant strongly reacts directly with the metal/oxide surfaces, exposing it to fluorides and chlorides resulting from decomposition of the halocarbon refrigerant, resulting in the formation of a metal halide inner layer in the bearing wear track. Metal chloride or fluoride formation reaches a critical layer thickness (e.g., a few nanometers). Metal fluorides (i.e., the Fe—F bond is very strong) are believed to form the protective tribolayer.

Trace contaminants such as water and oxygen (e.g., up to 100 ppm) may be present. These exo-electrons can react with $O_2$ and $H_2O$ contaminants, even at ppm levels, to form $O^-$ and $OH^-$ anions or radicals, respectively, which can be active agents for the initiation of tribochemical reactions leading to metal oxidation/hydroxylation and hydrofluoroolefin (HFO) refrigerant decomposition. The presence of $O_2$ and $H_2O$ contaminants at too high levels are not desired, because they can lead to detrimental metal corrosion and attack.

Halocarbon fragments from the tribochemical refrigerant decomposition can polymerize to form an oligomeric or polymeric halocarbon tribofilm that forms an outer layer deposit over the metal halide surface layer in the wear track. Some refrigerants can offer enhanced capacity to form tribochemical films. For example, the double bond of olefin refrigerants such as halogenated propenes (e.g., R1233zd, R1234ze, R1234yf) can react on metal and metal oxide surfaces. See, M. W. Akram, et al., Lubricity of environmentally friendly HFO-1234yf refrigerant. Tribology International January 2013; 57:92-100. DOI:10.1016/j.triboint.2012.07.013. In addition, the triboelectrons can initiate addition polymerization reactions of the refrigerant olefinic double bonds enhancing the formation of a solid deposit. See, G. E. Morales-Espejel, R. Meeuwenoord, A. F. Quiñonez and R. Hauleitner, Film thickness and traction measurements of refrigerant R1233zd used as lubricant in elastohydrodynamic conditions, Proc IMechE Part C: J Mechanical Engineering Science, 229(2) (2015) 244-253. However, the outer layer tribopolymer film formed from R1233zd alone, in the absence of the polar polymers or oligomers described herein, is not highly polymerized and is only weakly bound to the halogenated surface. In addition, acidic by-products, HCl and HF, and the halogenated metal surface can accelerate surface corrosion, especially in the presence of excess $O_2$ or $H_2O$ contaminants.

When oligomers or polymers having polar side groups are strongly bound to the bearing metal surfaces as a primer layer, the refrigerant in the bearing contact reacts more directly with the polymer or oligomer layer 106, and less directly with the metal surface. The polar groups of the polymer and oligomer can react with the halocarbons and halocarbon fragments that form upon refrigerant decomposition in the bearing mechanical contact. Thus, a refrigerant-derived tribofilm outer layer 108 is formed directly bonded to, and is supported by the inner strongly bound polar primer layer 106. This can help avoid the formation of the metal halide reaction product inner layer and acid by-products from the direct refrigerant reaction with the bearing metal/oxide surface. Many polar polymers or oligomers are amphiphilic, in that they contain non-polar hydrocarbon portions in addition to polar side groups. The non-polar portion may be compatible with the refrigerant tribofilm layer 108, so the amphiphilic polymers or oligomers can promote the bonding of the tribofilm layer 108 to the surface. The tribofilms anchored by the oligomeric or polymeric surface films strongly bonded to the surface provide a solid foundation to support elasto-hydrodynamic film formation for reduced surface wear.

Although the layers 106 and 108 are depicted in FIG. 2 with layer 106 as a contiguous underlayer 106 and layer 108 as an essentially contiguous overlayer, in practice the layers may be segmented so that they are not completely contiguous and also the relative positioning of the segments can vary. This film formation is self-limiting because the layer can undergo local deformation in the boundary regime and local regions can be worn away. The dissolved polar primer and refrigerant-derived tribolayer can be redeposited to self-heal any breaks in film attritted during wear. During film regeneration, the more strongly interacting polymers or oligomers with polar side groups can isolate the surfaces from direct reactions with the refrigerant, and thereby limit the formation of undesirable acid and metal halide side-products. Layer thickness can vary substantially, with the layer 106 varying in thickness from 50 to 500 nm, and the tribofilm layer 108 varying in thickness from 0 to 200 nm.

Halocarbons used in heat transfer fluids will provide lubrication to the bearing contact surfaces. In some aspects, lubrication provided by the halocarbon can be supplemented with lubrication from a lubricant oil included in the heat transfer fluid. Lubricating oils can be included at conventional levels, but in some aspects are eliminated or included at reduced levels so that the bearing contact surfaces are at least primarily lubricated by the halocarbon. Heat transfer systems where the bearing contact surfaces are primarily lubricated by the heat transfer fluid can use heat transfer fluids that have low levels of lubricating oils such as polyol esters, polyalkylene glycols, polyvinyl ethers, polyalphaolefins, alkylbenzenes, or mineral oils or no lubricating oils added to the heat transfer fluid. Low levels of lubricant oils can play a role in the formation of a refrigerant-derived tribofilm, and can contain, for example, levels of from 80-5000 ppm, more specifically 100-1000 ppm, or even more specifically 100-200 ppm, by weight based on the total weight of heat transfer fluid composition contained in the system. An example of a low-oil system is described in U.S. patent application Ser. No. 62/140,086, filed on or about Mar. 30, 2015, the disclosure of which is incorporated herein by reference in its entirety. In some exemplary embodiments, a tribofilm can be formed in conjunction with the polymer or oligomer layer 106, and oil-free or essentially oil free heat transfer fluid compositions are explicitly contemplated. In some aspects, a reduced-oil system utilizes from 0.1 wt. % to 3 wt. % of lubricant oils such as polyol esters, polyalkylene glycols, polyvinyl ethers, polyalpha olefins, alkylbenzenes, and mineral oils. In some embodiments ("oil-free" or "essentially oil-free") the system contains less than 80 ppm or 0.008 wt. % of lubricant oils such as polyol esters, polyalkylene glycols, polyvinyl ethers, polyalpha olefins, alkylbenzenes, and mineral oils, more specifically less than 50 ppm or 0.005 wt. %, and even more specifically less than 10 ppm or 0.001 wt. %, based on the total weight of heat transfer fluid composition contained in the system.

System additives may optionally be added, as desired, to the heat transfer fluid. These additives are generally known within the field of refrigeration compressor lubrication, and include antioxidants, corrosion and oxidation inhibitors, metal deactivators, acid scavengers, boundary additives, dispersants/detergents, foaming and antifoam control agents, leak detectants (e.g., UV-sensitive dyes), and the like. In general, these additives are present only in small amounts relative to the overall composition. They are typically used at concentrations of from less than about 0.001% to as much as about 3% of each additive. These additives are selected on the basis of the individual system requirements. Some typical examples of such additives may include, but are not limited to corrosive inhibitors (including vapor phase corrosion inhibitors), oxidation inhibitors, and acid scavengers, such as cyclohexylamine, hexamethyleneimine, piperidine, morpholine, di(isopropyl)amine, benzylamine, hexylamine, dihexylamine, octylamine, di(cyclohexyl)amine, aniline, diphenylamine, triphenylamine, and other aliphatic amines, diamines, and triamines, imidazolines, and ethanolamines, as well as epoxides. The corrosion inhibitors can also include the carbonate, carboxylate including acetate, benzoate, caprylate, laurate, oleate, salicylate, and sebacate, ester, nitrate, nitrite, chromic and molybdate salts with a primary, secondary, or tertiary amine; a primary, secondary, or tertiary alkanolamine, ammonia, or quaternary ammonium compound. Detergent and dispersant additives that act to suspend reaction by-products and debris can include carbamic acid, carbonic acid, alkyl carboxylic acids, naphthenic acids, benzoic acids, and lauric alcohol. Metal deactivators, that passivate metal fines and dissolved metal ions, include nitrogen ring structures, such as pyrazole, benzotriazoles, and imidazoles. Other boundary additives include natural product oils, fatty acids, and assymetrical polyhydroxyl lubrication additives such as Synergol TMS (International Lubricants). Similarly, stabilizers such as antioxidants, free radical scavengers, and water scavengers may be employed. Compounds in this category can include, but are not limited to, butylated hydroxytoluene (BHT) and alpha-tocopherol.

In some exemplary embodiments, the heat transfer fluid can additionally include a corrosion inhibitor, acid scavenger, or antioxidant. Such additives can be beneficial across the full scope of the disclosure herein. It has been unexpectedly discovered however, that tribofilms formed by some halocarbons can release corrosive side-products such as hydrochloric acid or hydrofluoric acid. Accordingly, exemplary embodiments are explicitly contemplated where the heat transfer fluid comprises a corrosion inhibitor, antioxidant e.g., BHT in combination with the polar oligomer or polymer and halocarbon refrigerant as described herein. In some embodiments, the halocarbon is a halogenated olefin, and even more specifically a halogenated olefin comprising fluoro and chloro substituents. Exemplary corrosion inhibitors include triazoles, inorganic and organic nitrites, nitrates, phosphates and carbonates, and aliphatic and aromatic amines or their salts which are believed to migrate to the surface in the presence of water vapor and which provide the desired protection although the mechanism is not fully understood. These compositions may also include desiccants and can be water-based compositions which generally include a carrier such as mineral oil. Such compositions are described in the literature including Carlson et al U.S. Pat. No. 4,973,448; Miksic et al U.S. Pat. No. 5,139,700; Miksic U.S. Pat. No. 5,209,869; and Miksic et al U.S. Pat. No. 5,320,778. Suitable compositions are readily available from Cortec Corporation of St. Paul Minn. and illustrative materials which have been satisfactorily employed are those sold by Cortec under the designations VCI-337 and VCI-337F and MASTERBATCH 126 (see U.S. Pat. No. 5,139,700, the disclosure of which is incorporated herein by reference in its entirety).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A heat transfer system comprising a circulation loop of a halocarbon heat transfer fluid, the circulation loop including a compressor or pump that includes bearing contact surfaces lubricated by the heat transfer fluid, including a metal or ceramic contact surface comprising a metal substrate having thereon a layer comprising an oligomer or a polymer, said oligomer or polymer comprising an oligomer or polymer backbone and polar side groups appended to the oligomer or polymer backbone, and a tribofilm.

2. The heat transfer system of claim 1, wherein the heat transfer fluid comprises less than 0.008 wt. % of lubricant oils selected from polyol esters, polyalkylene glycols, polyvinyl ethers, polyalpha olefins, alkylbenzenes, or mineral oils, based on the total weight of the heat transfer fluid.

3. The heat transfer system of claim 1, wherein the heat transfer fluid comprises from 0.008 wt. % to 0.5 wt. % of lubricant oils selected from polyol esters, polyalkylene glycols, polyvinyl ethers, polyalpha olefins, alkylbenzenes, or mineral oils, based on the total weight of the heat transfer fluid.

4. The heat transfer system of claim 1, wherein the heat transfer fluid comprises from 0.1 wt. % to 3.0 wt. % of lubricant oils selected from polyol esters, polyalkylene glycols, polyvinyl ethers, polyalpha olefins, alkylbenzenes, or mineral oils, based on the total weight of the heat transfer fluid.

5. The heat transfer system of claim 1, wherein polar side groups comprise nitrogen or oxygen atoms.

6. The heat transfer system of claim 5, wherein the polar side groups are selected from carboxylate, ester, aldehyde or ketone carbonyl, alcohol, nitrile, amine, amide, imide, or imidazole groups.

7. The heat transfer system of claim 1, wherein the oligomer or polymer is selected from polyaryl ether ketones including polyether ether ketones, branched polyethylenimines, polyvinyl pyridines, polyvinyl pyrrolidones, polycarbonates, polyacrylates including polyalkyl acrylates, polyalkyl and alkylacrylates, polyacrylamides, polyacrylic acids, polyacrylonitriles, or polyvinyl imidazoles.

8. The heat transfer system of claim 1, wherein the oligomer contains from 2 to 100 repeat units and the polymer contains from 101 to 1000 repeat units.

9. The heat transfer system of claim 1, wherein the oligomer or polymer comprising polar side groups is present in said tribobilm and also in the heat transfer fluid, the oligomer or polymer being present in the heat transfer fluid in an amount of from 0.01 wt. % to 1 wt. %, based on based on the total weight of the heat transfer fluid.

10. The heat transfer system of claim 9, wherein the halogenated olefin is halogenated propene.

11. The heat transfer system of claim 1, wherein the layer on the metal substrate comprises the polymer comprising polar side groups.

12. The heat transfer system of claim 11, wherein the layer on the metal substrate comprises the oligomer comprising polar side groups.

13. The heat transfer system of claim 1 wherein the halocarbon comprises fluoro substituents.

14. The heat transfer system of claim 13, wherein the halocarbon comprises a 1-chloro-3,3,3-trifluoropropene (E-HFO-1233zd or R1233zd(E)), 2-chloro-3,3,3-trifluoropropene, 3,3,3-trifluoropropene (HFO-1234zf), Z-1,3,3,3-tetrafluoropropene (Z-HFO-1234ze), 2,3,3,3-tetrafluoropropene (HFO-1234yf), E-1,2,3,3,3-pentafluoropropene (E-HFO-1255ye), or Z-1,2,3,3,3-pentafluoropropene (Z-HFO-125ye).

15. The heat transfer system of claim 14, wherein the additive includes a vapor phase corrosion inhibitor comprising a carbonate, carboxylate (benzoate, caprylate, and salicylate), nitrate, nitrite, chromic, or molybdate salt of an amine.

16. The heat transfer system of claim 13 wherein the halocarbon comprises fluoro and chloro substituents.

17. The heat transfer system of claim 1, wherein the halocarbon is a halogenated olefin.

18. The heat transfer system of claim 1, wherein the heat transfer fluid further comprises one or more additives selected from antioxidants, corrosion inhibitors, oxidation inhibitors, acid scavengers, dispersants, detergents, metal deactivators, boundary additives.

19. The heat transfer system of claim 1, that is a vapor compression heat transfer system comprising a compressor that includes said bearing contact surface, a heat rejection heat exchanger, an expansion device, and a heat absorption heat exchanger, connected together by conduits to form said circulation loop.

20. The heat transfer system of claim 1, wherein the bearing contact surfaces comprises ceramic rolling elements and a high nitrogen CrMo martensitic steel ring.

* * * * *